K. Z. KIEFER.
SAFETY SIGNAL FOR VEHICLES.
APPLICATION FILED JULY 3, 1917.
1,263,902.
Patented Apr. 23, 1918.
2 SHEETS—SHEET 2.
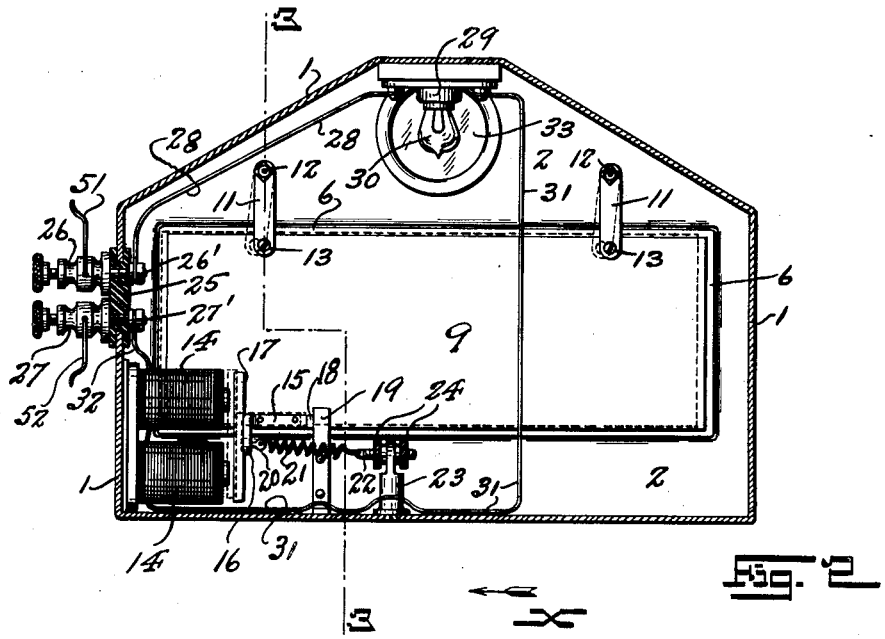
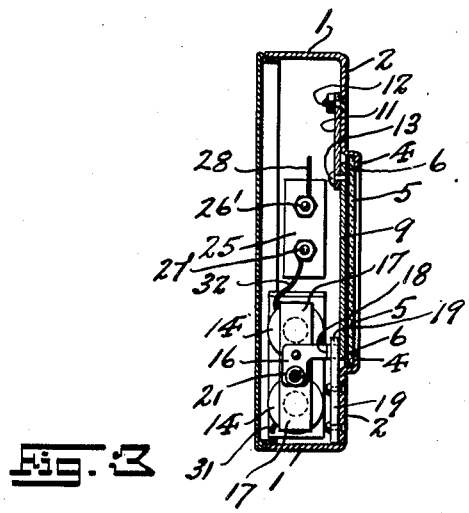
WITNESSES:
Fred'k H. W. Frantzel
Eva E. Desch
INVENTOR
Karl Z. Kiefer,
BY
Frantzel and Richards,
ATTORNEYS

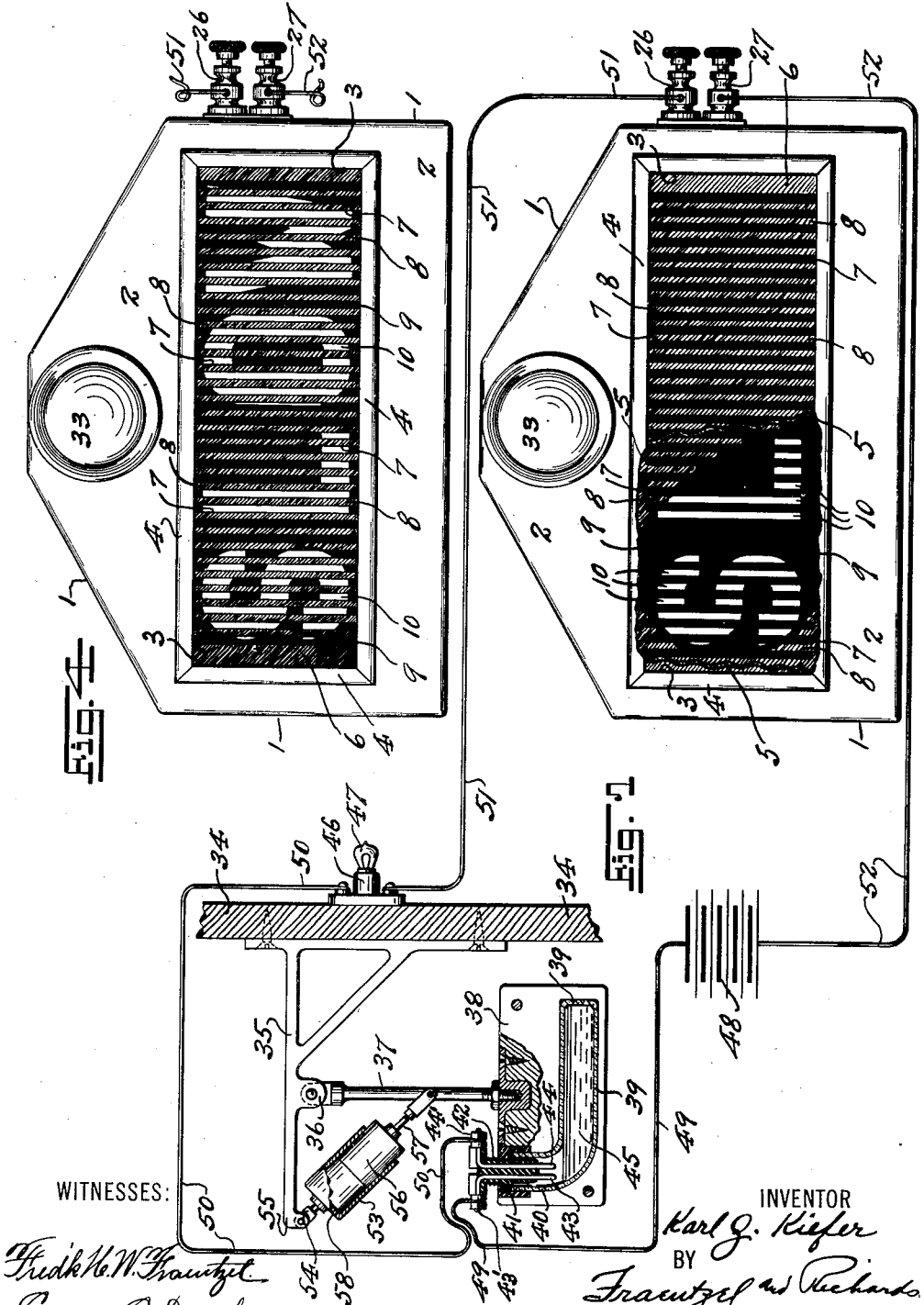

UNITED STATES PATENT OFFICE.

KARL Z. KIEFER, OF NEWARK, NEW JERSEY.

SAFETY-SIGNAL FOR VEHICLES.

1,263,902.     Specification of Letters Patent.     Patented Apr. 23, 1918.

Application filed July 3, 1917. Serial No. 178,437.

*To all whom it may concern:*

Be it known that I, KARL Z. KIEFER, a citizen of the United States, residing at Newark, in the county of Essex and State of New Jersey, have invented certain new and useful Improvements in Safety-Signals for Vehicles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in signaling devices; and, the invention has reference, more particularly, to a novel and simply constructed automatic signaling device for installation upon moving bodies, such, for example, as an automobile or other vehicle.

The invention has for its principal object to provide a novel construction of electrically operated day and night signal which can be mounted on a vehicle so as to automatically indicate to other vehicles the intended stopping or turning of the said vehicle upon which such signal is installed.

The invention has for its further object to provide a novel construction of signal device, the signal indication of which is visible in day light, and which is equally visible by means of automatic illumination at night.

Other objects of the present invention, not at this time more particularly enumerated, will be clearly understood from the following detailed description of the same.

The said invention consists, primarily, in the novel construction of electrically operated signaling device hereinafter set forth; and, the invention consists, furthermore, in the several novel arrangements and combinations of the various devices and parts, as well as in the details of the construction of said parts, all of which will be hereinafter more fully described and claimed.

The invention is clearly illustrated in the accompanying drawings, in which:—

Figure 1 is a face view of the novel signal and the electric control and operating devices therefor, certain parts of the signal indication devices being broken away to more clearly illustrate the construction thereof.

Fig. 2 is a longitudinal section of the casing of the signal showing the interior arrangement of the operative parts thereof, said parts being viewed from the rear side of said signal.

Fig. 3 is a transverse section of said signal, taken on line 3—3 in said Fig. 2, looking in the direction of the arrow *x*.

Fig. 4 is a face view of the signal, the signal indication devices being shown in operative position.

Similar characters of reference are employed in all of said hereinabove described views, to indicate corresponding parts.

Referring now to said drawings, the reference character 1 indicates a casing in which the signaling devices are contained. The front wall 2 of said casing is provided with a window opening 3, surrounded by a marginal off-set bead or lip 4. Arranged within said window opening 3 is a transparent panel 5 of glass or other suitable material. Arranged back of said panel 5 is a grating member 6, comprising vertically disposed alternated open spaces 7 and opaque strips or bars 8. If desired said grating member 6 may be formed as a separate member or as part of the glass panel 5, in the latter case the strips or bars 8 being formed by treating the glass or other material of the panel with a proper substance adapted to render the parts thereof coincident to the proper position of the strips or bars 8 opaque or non-transparent, the intervening open spaces 7 being left clear or transparent.

The reference character 9 indicates an indicator plate adapted to be arranged in back of said panel 5 and grating member 6, and mounted so as to be capable of a limited longitudinal movement relative to the latter. Said indicator plate 9 is suitably rendered opaque or non-transparent, except for spaced vertical portions 10 which are left clear and translucent, and which are so grouped or arranged as to produce letter-character designs to produce a suitable signal indication or word, such as the word "Slow." Preferably said indicator plate 9 is prepared from white celluloid or glass, and its opaque portions rendered black and in good contrast to the vertical translucent portions 10, so that when viewed in day light an easily visible and readable signal indication is provided, which, being translucent, is rendered equally visible and readable at night or in darkness, by directing illuminating light rays therethrough.

Said indicator plate 9 is secured in position by means of a pair of suspension links 11, the upper ends of which are pivotally secured upon pivot bolts 12 mounted on the front wall 2 of said casing 1, and the lower ends of which are pivotally secured to the upper marginal edge of said indicator plate 9 by means of rivets 13, or other suitable means.

When in normal position said indicator plate 9 is so disposed that its translucent vertical portions 10 are registered with and behind the strips or bars 8 of the grating-member 6, and consequently the signal indication or word formed thereby is hidden from view and remains invisible (as illustrated in Fig. 1 of the drawings). When, however, a sufficient longitudinal movement or shift of the indicator plate 9 occurs, by swinging the same longitudinally on its suspension links, said translucent vertical portions 10 are moved into registration with and behind the open spaces 7 of said grating member 6, through which open spaces 7 the signal indication formed by said translucent vertical portions 10 may be viewed and read to render visible the said signal indication (as illustrated in Fig. 4 of the accompanying drawings).

The means for operating the indicator plate 9 comprises a suitably positioned electro-magnet 14 mounted within said casing 1, preferably adjacent to the lower marginal edge of said indicator-plate 9. Secured to the lower marginal edge of said indicator-plate 9 is a bracket-piece 15, having at one end a rearwardly extending arm 16 to which is secured a suitable armature-piece 17 normally presented within the sphere of the attractive influence of said electro-magnet 14. Connected with the opposite end of said bracket-piece 15 is a rearwardly projecting stop-lug 18, which normally engages a stationary stop-post 19 secured to the front wall 2 of said casing 1. Also connected with said arm 16 of said bracket-piece 15 is an eye-member 20 to which is secured a pull-spring 21, the opposite end of which is secured to a screw threaded adjusting screw 22 which is mounted transversely in the upper end of an anchor-post 23, and which is provided, on opposite sides of said anchor-post 23 with suitable adjusting nuts 24, so that by proper manipulation of said adjusting screw 22 the tension of said pull-spring may be properly regulated. Said pull-spring 21 tends to normally pull said armature piece 17 away from the electro-magnet 14 and through said bracket-piece 15 pulls the stop-lug 18 against the stop-post 19, thereby returning and maintaining said indicator-plate 9 in normal inoperative position.

Secured in a side wall of said casing 1 is an insulator block 25, in which are secured a pair of electric binding-posts 26 and 27, the same being arranged to project exteriorly from the side of said casing 1.

Connected with the inner end 26' of the binding post 26 is an electric conductor or wire 28 leading to a lamp-socket 29 secured within said casing 1, and in which socket 29 is connected a suitable electric lamp 30 for illuminating the interior of said casing, and for supplying illuminating light rays to said indicator plate 9. Leading from said lamp-socket 29 is an electric conductor 31 leading to one pole of said electro-magnet 14, and leading from the other pole of said electro-magnet 14 is an electric conductor 32 leading to the inner end 27' of the other binding-post 27. Said front wall 2 of the casing may be provided, in proximity to said electric-lamp 30, with a suitably secured translucent lens 33, which, when the signal employed at night upon a vehicle, may transmit a signaling light easily visible at a considerable distance.

It will be readily understood that when an electric current is sent through the conductors or wires 28, 31 and 32, the lamp 30 is illuminated and the electromagnet 14 is energized, consequently the latter exerts an attractive force upon the armature piece 17, against and overcoming the tension of the pull-spring 21, which is thereupon transmitted to the indicator-plate 9, whereby the same is moved longitudinally into operative signaling position, and so maintained so long as the electric current continues to flow through the electro-magnet. Upon the breaking of the electric curcuit to the magnet, however, the attractive force of the latter ceases, and the pull spring again returns the indicator-plate 9 to normal initial inoperative position.

The novel signal device thus provided is automatically operated, without the necessity of manual control or mental attention being exercised by the driver of the vehicle upon which it is installed, by the following electrical devices.

Secured upon the dash-board 34 of the vehicle upon which the signal is mounted, and preferably so as to be located beneath the hood and within the engine compartment in the case of an automobile, is a supporting bracket 35, of any suitable shape or design, but provided with a fulcrum ear 36, at which point is pivotally connected thereto a depending arm or rod 37 to the lower end of which is secured a body 38 adapted to house certain automatic circuit closing devices.

Suitably secured within and supported by said body 38 is a tube 39, closed at its rearward end and having at its forward end an open up-turned portion 40 closed by a suitable cap 41, through which enters and in which is secured a plug 42 of insulating material. Extending downwardly through said plug 42, and electrically separated thereby, are a pair of metallic contact points 43 and 44, which extend into the interior of said tube 39. Connected with the outer end of said contact point 43 is a suitable binding post or terminal device 43', and, in like manner, connected with the outer end of said contact point 44 is a suitable binding-post or terminal device 44'. Contained within said tube 39 is a quantity of mercury or quicksilver 45. Secured upon the said dashboard 34, in a suitable location, within easy vision of the driver of the vehicle, is a lamp-socket 46 in which is connected a pilot-light lamp 47. The reference character 48 indicates a battery or other suitable source of electric current. Leading from one pole of said battery 48 is a conductor or wire 49 which leads to the terminal device 43' of said contact point 43. Leading from said terminal device 44' of said contact point 44 is a conductor or wire 50 which leads to one pole of said lamp-socket 46, and from the other pole of said lamp-socket 46 extends a conductor or wire 51 which leads to said binding post 26 of the signal device. Connected with and extending from the binding post 27 of said signal device is a conductor or wire 52 which leads back to the battery 48, thus completing an electric circuit through which the several devices operate.

The above described devices operate as follows:—When the vehicle upon which the signal devices are installed moves forward at a uniform speed, the mercury 45 partakes of the motion of the vehicle and remains level, so that the same does not touch the contact points 43 and 44. When, however, the speed of the vehicle is checked, the mercury 45 continues in motion by virtue of the physical law of inertia, and consequently tends to move bodily toward the forward end of the tube 39, and is thereupon moved into engagement with the contact points 43 and 44, bridging the gap separating the same, and permitting the battery current to flow from one contact point to the other, thus closing the electric circuit. The electric current is thus caused to flow to and through the signal device, whereupon it energizes the electro-magnet 14 and operates the indicator plate 9 to display the warning signal at the rear of the vehicle, in the manner already above described. When the vehicle resumes a state of uniform motion, or comes to rest, the mercury 45 again seeks normal level, thereupon moving away from the contact points 43 and 44, and breaking the electric current, so that the signal device again resumes its normal initial inoperative condition.

When the vehicle is ascending or descending hills during the course of its travel, and is consequently moved out of a normal horizontal plane, the mercury tube 39 and its supporting body 38 must be permitted to adjust itself to a normal horizontal plane, so that the level of the mercury 45 will not be changed, or abnormally maintained in engagement with the contact points 43 and 44. To this end the supporting body is mounted to swing at the end of the rod 37, and by virtue of such pedulum like mounting thereof, tends, under the pull of gravity, always to resume a normal perpendicular alinement from its point of suspension, consequently maintaining the tube 39 in a normal horizontal plane, as will be understood from an inspection of Fig. 1 of the drawings. In order to prevent undue vibration or swinging of the body, under the normal vibrations or shocks imparted to the vehicle during its travel over more or less rough roads, I provide a checking mechanism, comprising a cylinder 53 pivoted at one end by its fulcrum lug 54 to a fulcrum provided at the extremity 55 of the bracket 35. Slidably disposed in said cylinder 53 is a piston 56, provided with a connecting rod or link 57, the outer extremity of which is pivotally connected with said rod 37. The head of said cylinder is provided with a small escape vent 58. Any sudden jar or vibration tending to abnormally swing outward the rod 37 and body 38 from their normal perpendicular, tends to push the piston 56 into the cylinder 53, compressing the air in the latter faster than it can escape through the vent 58, which provides a checking cushion against such abnormal movement, until the effect of such sudden jar or vibration is overcome. If the tendency of the jar or vibration is to swing the rod 37 and body 38 inward, the piston is pulled outward from the cylinder, but since the movement is faster than air can enter through the vent 58 a suction against said piston, due to the partial vacuum formed in the cylinder, tends to check such abnormal movement. When, however, the inclination of the vehicle from normal horizontal plane in either direction is appreciably continued, the pull of gravity upon the supporting body 38, exerts a sufficient continued pressure in one direction or the other upon the piston, as will give time for air to be either expelled or drawn into the cylinder, thus automatically adjusting the checking device to the desired condition, as will be clearly understood.

I am aware that some changes may be made in the general arrangements and combinations of the devices and parts, as well as in the details of the construction of the same, as described in the foregoing specification, without departing from the scope of the present invention as defined in the appended claims. Hence, I do not limit my invention to the exact arrangements and combinations of the several devices and parts as set forth in the foregoing specification, nor do I confine myself to the exact details of the construction of the said parts as illustrated in the accompanying drawings.

I claim:—

1. In a device of the kind described, a casing, the front wall of said casing having an opening therein, a grating comprising a plurality of narrow alternated opaque vertical bars and narrow clear open spaces of equal width, an opaque indicator plate in the rear of said grating having a signal design made up of translucent vertical spaces equal in width to said clear open spaces of said grating, said indicator plate being normally positioned so that said translucent vertical spaces are behind and covered by the opaque bars of said grating, means supporting said indicator plate so that a limited longitudinal movement equivalent to the width of said vertical bars of said grating may be imparted thereto to move said translucent spaces into alined and exposed relation to said open spaces of said grating, an electro-magnet for inducing said limited movement of said indicator plate, an armature secured to said indicator plate in coöperative relation to said magnet, means for stopping said indicator plate in normal position, spring-means for returning said indicator plate to normal stopped position, and means for closing an electric circuit through said magnet.

2. In a device of the kind described, a casing, the front wall of said casing having an opening therein, a grating comprising a plurality of narrow alternated opaque vertical bars and narrow clear open spaces of equal width, an opaque indicator plate in the rear of said grating having a signal design made up of translucent vertical spaces equal in width to said clear open spaces of said grating, said indicator plate being normally positioned so that said translucent vertical spaces are behind and covered by the opaque bars of said grating, means supporting said indicator plate so that a limited longitudinal movement equivalent to the width of said vertical bars of said grating may be imparted thereto to move said translucent spaces into alined and exposed relation to said open spaces of said grating, an electro-magnet for inducing said limited movement of said indicator plate, an armature secured to said indicator plate in coöperative relation to said magnet, means for stopping said indicator plate in normal position, spring-means for returning said indicator plate to normal stopped position, tension adjusting devices for said spring means, and means for closing an electric circuit through said magnet.

3. In a device of the kind described, a casing, the front wall of said casing having an opening therein, a grating comprising alternated opaque vertical bars and clear open spaces, an opaque indicator plate in the rear of said grating having a signal design made up of translucent vertical spaces, means supporting said indicator plate so that limited longitudinal movement may be imparted thereto, an electro-magnet, an armature piece connected with said indicator plate whereby the attractive force of said electro-magnet exerted upon said armature imparts a limited longitudinal movement to said indicator plate to position the same to disclose its signal design through the clear open spaces of said grating, a stop-post within said casing, a stop-lug connected with said indicator plate, spring means for retracting said indicator-plate to normal initial position as determined by the engagement of said stop-lug with said stop-post, means within said casing for illuminating said signal design, an electric circuit including said electro-magnet, and an inertia controlled circuit closer for controlling the current through said circuit.

4. In a device of the kind described, a casing, the front wall of said casing having an opening therein, a grating comprising alternated opaque vertical bars and clear open spaces, an opaque indicator plate in the rear of said grating having a signal design made up of translucent vertical spaces, means supporting said indicator plate so that limited longitudinal movement may be imparted thereto, an electro-magnet, an armature piece connected with said indicator plate whereby the attractive force of said electro-magnet exerted upon said armature imparts a limited longitudinal movement to said indicator plate to position the same to disclose its signal design through the clear open spaces of said grating, an electric circuit including said electro-magnet, and an inertia controlled circuit closer for controlling the current through said circuit.

5. In a device of the kind described, a casing, the front wall of said casing having an opening therein, a grating comprising alternated opaque vertical bars and clear open spaces, an opaque indicator plate in the rear of said grating having a signal design made up of translucent vertical spaces, means supporting said indicator plate so that limited longitudinal movement may be imparted thereto, an electro-magnet, an armature piece connected with said indicator plate whereby the attractive force of said electro-magnet exerted upon said armature imparts a limited longitudinal movement to said indicator plate to position the same to disclose its signal design through the clear open spaces of said grating, a stop-post within said casing, a stop-lug connected with said indicator plate, spring means for retracting said indicator-plate to normal initial position as determined by the engagement of said stop-lug with said stop-post, an electric circuit including said electro-magnet, and an inertia controlled circuit closer for controlling the current through said circuit.

6. In a device of the kind described, a casing, the front wall of said casing having an opening therein, a grating comprising alternate vertical parallel bars and clear open spaces, an opaque indicator plate in the rear of said grating having a signal design made up of translucent vertical parallel spaces, suspension links connected with the upper marginal edge of said indicator plate, means for pivoting said suspension links on the front wall of said casing, stop-means for determining the normal initial position of said indicator plate, spring means for retracting said indicator plate to normal position, and electro-magnetic means for imparting a limited longitudinal movement to said indicator-plate to disclose its signal design through the open clear spaces of said grating, an electric circuit including said electro-magnet, and an inertia controlled circuit closer for controlling the current through said circuit.

7. In a device of the kind described, a casing, the front wall of said casing having an opening therein, a grating comprising alternated vertical parallel bars and clear open spaces, an opaque indicator plate in the rear of said grating having a signal design made up of translucent vertical parallel spaces, suspension links connected with the upper marginal edge of said indicator plate, means for pivoting said suspension links on the front wall of said casing, stop-means for determining the normal initial position of said indicator plate, spring means for retracting said indicator plate to normal position, an electro-magnet in said casing, an armature fixed to said indicator plate, an electric lamp within said casing for illuminating said signal design of said indicator plate, a translucent signal lens fixed in said front wall of said casing adjacent to said lamp, an electric circuit including said electro-magnet and said lamp, and an inertia controlled circuit closer for controlling the current through said circuit.

8. In a device of the kind described, a casing, the front wall of said casing having an opening therein, a grating comprising alternate vertical parallel bars and clear open spaces, an opaque indicator plate in the rear of said grating having a signal design made up of translucent vertical parallel spaces, suspension links connected with the upper marginal edge of said indicator plate, means for pivoting said suspension links on the front wall of said casing, stop-means for determining the normal initial position of said indicator plate, spring means for retracting said indicator plate to normal position, an electro-magnet in said casing, an armature fixed to said indicator plate, an electric lamp within said casing for illuminating said signal design of said indicator plate, an electric circuit including said electro-magnet and said lamp, and an inertia controlled circuit closer for controlling the current through said circuit.

In testimony that I claim the invention set forth above I have hereunto set my hand this 29th day of June, 1917.

KARL Z. KIEFER.

Witnesses:
 FREDK. C. FRAENTZEL,
 FREDK. H. W. FRAENTZEL.